(12) United States Patent
Kironn et al.

(10) Patent No.: US 9,656,344 B2
(45) Date of Patent: May 23, 2017

(54) METHOD FOR INTEGRATING MULTIPLE MATERIALS IN A FOIL CONSOLIDATION OF ADDITIVE MANUFACTURING PROCESS

(71) Applicant: United Technologies Corporation, Hartford, CT (US)

(72) Inventors: Lexia Kironn, Rocky Hill, CT (US); Sergey Mironets, Charlotte, NC (US); Wendell V. Twelves, Jr., Glastonbury, CT (US); Agnes Klucha, Panton, VT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 14/911,173

(22) PCT Filed: Aug. 4, 2014

(86) PCT No.: PCT/US2014/049590
§ 371 (c)(1),
(2) Date: Feb. 9, 2016

(87) PCT Pub. No.: WO2015/020954
PCT Pub. Date: Feb. 12, 2015

(65) Prior Publication Data
US 2016/0193688 A1    Jul. 7, 2016

Related U.S. Application Data

(60) Provisional application No. 61/864,022, filed on Aug. 9, 2013.

(51) Int. Cl.
*B23K 20/10* (2006.01)
*B23K 20/22* (2006.01)
(Continued)

(52) U.S. Cl.
CPC ............ *B23K 20/103* (2013.01); *B23K 20/22* (2013.01); *B23K 26/083* (2013.01);
(Continued)

(58) Field of Classification Search
CPC .... B23K 20/103; B23K 20/22; B23K 26/083; B23K 26/0869; B23K 26/38; B23K 26/40;
(Continued)

(56) References Cited

U.S. PATENT DOCUMENTS 4,752,352 A * 6/1988 Feygin ................. B23K 26/083
156/154
5,031,483 A * 7/1991 Weaver .................. B21D 37/20
451/5
(Continued)

FOREIGN PATENT DOCUMENTS

JP    H10244381 A    9/1998
JP    2009530867 A   8/2009

OTHER PUBLICATIONS

International Search Report and Written Opinion from PCT Application Serial No. PCT/US2014/049590, dated Nov. 11, 2014, 10 pages.

*Primary Examiner* — Geoffrey S Evans
(74) *Attorney, Agent, or Firm* — Kinney & Lange, P.A.

(57) ABSTRACT

A method of forming an object includes installing multiple foil drums within a processing chamber of an ultrasonic consolidation system. The multiple foil drums each include different materials than the other foil drums. The multiple foil drums are positioned so that one of the foils is selected to be placed on top of the build platform. The selected foil is welded onto the build platform or onto a previously processed layer. A portion of the welded foil is then cut. The multiple foil drums are retracted away from the build platform. The portion of the welded foil that was just cut is
(Continued)

then consolidated to the object. The build platform is incrementally lowered before the process is repeated to form the next layer of the object.

20 Claims, 3 Drawing Sheets

(51) Int. Cl.
   *B23K 26/40* (2014.01)
   *B33Y 10/00* (2015.01)
   *B33Y 30/00* (2015.01)
   *B23K 26/08* (2014.01)
   *B23K 26/38* (2014.01)
   *B33Y 40/00* (2015.01)
   *B23K 101/18* (2006.01)
   *B23K 103/18* (2006.01)
   *B23K 103/16* (2006.01)

(52) U.S. Cl.
   CPC .......... *B23K 26/0869* (2013.01); *B23K 26/38* (2013.01); *B23K 26/40* (2013.01); *B33Y 10/00* (2014.12); *B33Y 30/00* (2014.12); *B23K 2201/185* (2013.01); *B23K 2203/172* (2015.10); *B23K 2203/18* (2013.01); *B33Y 40/00* (2014.12)

(58) Field of Classification Search
   CPC ........ B23K 2201/185; B23K 2203/172; B23K 2203/18; B33Y 10/00; B33Y 30/00; B33Y 40/00
   See application file for complete search history.

(56) References Cited

U.S. PATENT DOCUMENTS

| | | | |
|---|---|---|---|
| 5,730,817 A | 3/1998 | Feygin et al. | |
| 5,876,550 A * | 3/1999 | Feygin | B22C 9/00 156/256 |
| 6,450,393 B1 * | 9/2002 | Doumanidis | B23P 15/00 156/264 |
| 6,519,500 B1 | 2/2003 | White | |
| 6,575,218 B1 * | 6/2003 | Burns | B22F 3/005 156/248 |
| 6,627,835 B1 * | 9/2003 | Chung | B23H 7/02 219/121.72 |
| 6,814,823 B1 * | 11/2004 | White | B23K 11/0013 156/73.1 |
| 7,648,740 B2 | 1/2010 | Slaughter | |
| 8,082,966 B2 | 12/2011 | Short | |
| 8,272,424 B2 | 9/2012 | Short | |
| 2007/0029368 A1 | 2/2007 | Kubouchi et al. | |
| 2012/0152507 A1 | 6/2012 | Godry | |
| 2016/0090842 A1 * | 3/2016 | Luo | B29C 67/0074 416/232 |
| 2016/0101470 A1 * | 4/2016 | Kamakura | B22F 3/1055 419/5 |

\* cited by examiner

METHOD FOR INTEGRATING MULTIPLE MATERIALS IN A FOIL CONSOLIDATION OF ADDITIVE MANUFACTURING PROCESS

BACKGROUND

This invention relates generally to the field of additive manufacturing. In particular, the present disclosure relates to an additive manufacturing process including ultrasonic consolidation systems.

Additive manufacturing is an established but growing technology. In its broadest definition, additive manufacturing is any layerwise construction of articles from thin layers of feed material. Additive manufacturing may involve applying liquid, layer, or particle material to a workstage, then sintering, curing, melting, and/or cutting to create a layer. The process is repeated up to several thousand times to construct the desired finished component or article.

Various types of additive manufacturing are known. For example, stereolithography (additively manufacturing objects from layers of a cured photosensitive liquid), Electron Beam Melting (using a pulverant material as feedstock and selectively melting the pulverant material using an electron beam), Laser Additive Manufacturing (using a pulverant material as a feedstock and selectively melting the pulverant material using a laser), and Laminated Object Manufacturing (applying thin, solid sheets of material over a workstage and using a laser to cut away unwanted portions) are known. Another known method of additive manufacturing is ultrasonic compaction, also known as ultrasonic consolidation. Through a Laminated Object Manufacturing process, layers of materials are added to a build platform and are then ultrasonically compacted to form a layer of a component. Current Laminated Object Manufacturing processes and their derivatives are capable of building parts using only one type of metal foil in the build chamber.

SUMMARY

A method of forming an object includes installing multiple foil drums within a processing chamber of an ultrasonic consolidation system. The multiple foil drums each include different materials than the other foil drums. The multiple foil drums are positioned so that one of the foils is selected to be placed on top of the build platform. The selected foil is welded onto the build platform or onto a previously processed layer. A portion of the welded foil is then cut. The multiple foil drums are retracted away from the build platform. The portion of the welded foil that was just cut is then consolidated to the object. The build platform is incrementally lowered before the process is repeated to form the next layer of the object.

An additional embodiment of the present disclosure includes an additive manufacturing method. The method includes positioning multiple foil drums of an ultrasonic consolidation system so that a first foil is selected to be placed on top of the build platform. The first foil is welded onto the build platform or onto a previously processed layer. A portion of the welded foil is selectively cut with a laser beam emitted from a laser source according to a computer aided design file including data defining the object. The multiple foil drums are retracted away from the build platform. The portion of the welded foil that was just cut is then consolidated to the object. The build platform is then incrementally lowered. The multiple foil drums are repositioned so as to place a second selected foil over the build platform. These steps are repeated to form the next layer of the object.

An additional embodiment of the present disclosure includes an additive manufacturing apparatus. An ultrasonic consolidation system is located within a processing chamber of the additive manufacturing apparatus. A foil drum assembly is installed in the ultrasonic consolidation system. Multiple foil drums of different materials are located on the foil drum assembly. A build platform is located underneath one of the multiple foil drums. A laser source is located above the build platform. A sonotrode is located above the build platform.

DETAILED DESCRIPTION

Figure 1:
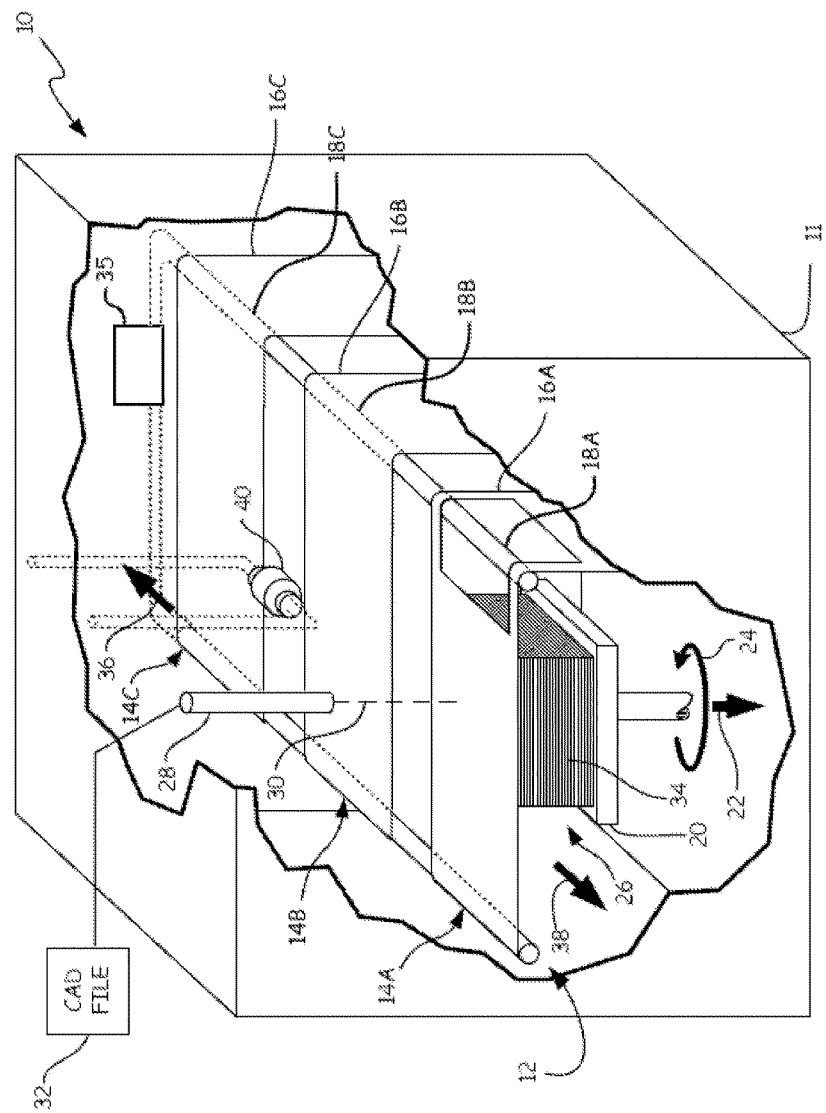
FIG. 1 is a simplified perspective view of an ultrasonic consolidation system incorporating multiple foil drums in accordance with the present disclosure.

FIG. 1 is a simplified perspective view of an ultrasonic consolidation system incorporating multiple foil drums in accordance with the present disclosure. Ultrasonic consolidation system 10 includes processing chamber 11. Metal foil drum assembly 12 is included in ultrasonic consolidation system 10, and metal foil drum assembly 12 is positioned within processing chamber 11. First metal foil drum 14A, second metal foil drum 14B, and third metal foil drum 14C are installed as part of metal foil drum assembly 12. First metal foil drum 14A includes first metal foil material 16A, second metal foil drum 14B includes second metal foil material 16B, and third metal foil drum 14C includes third metal foil material 16C. First roller 18A is positioned as part of metal foil drum assembly 12 and is positioned to receive first metal foil material 16A. Second roller 18B is positioned as part of metal foil drum assembly 12 and is positioned to receive second metal foil material 16B. Third roller 18C is positioned as part of metal foil drum assembly 12 and is positioned to receive third metal foil material 16C. Build platform 20 is positioned underneath metal foil drum assembly 12. Build platform 20 is capable of vertical motion 22 and rotational motion 24. Object 26 is positioned on top of build platform 20.

The multiple metal foil drums installed on metal foil drum assembly 12 allows for processing a laminated structure of multiple metal materials. Ultrasonic consolidation system 10 including metal foil drum assembly 12 allows different parts of object 26 to be made of multiple metal foil materials. For example, in an aero engine, the blade attachment and airfoil platform could be processed with In 100 or In 718, and the airfoil could be processed with In 625 alloys. Other metallic and non-metallic materials can be used within ultrasonic consolidation assembly 10 to create object 26 with multiple materials.

Laser source 28 is positioned above metal foil drum assembly 12. Laser source 28 emits laser beam 30. Laser source 28 receives data from computer aided design ("CAD") file 32 that provides instructions for cutting processed layers 34 of object 26 with laser beam 30. Metal foil drum assembly 12 is mounted to translating mechanism 35.

Translating mechanism 35 enables movement of metal foil drum assembly 12 in first transverse direction 36 and in second transverse direction 38. Translating mechanism 35 maneuvers metal foil drum assembly 12 so that one of first metal foil material 16A, second metal foil material 16B, and third metal foil material 16C is positioned above build platform 20. Laser source 28 is mounted within ultrasonic consolidation system 10 such that after one of processed layers 34 of object 26 is cut by laser beam 30, laser source 28 is maneuvered into a position away from above object 26 to allow sonotrode 40 to be positioned above object 26. Sonotrode 40 is positioned within ultrasonic consolidation system 10 such that after one of processed layers 34 of object 26 is cut by laser beam 30, sonotrode 40 is maneuvered into a position above object 26 to perform ultrasonic consolidation of object 26.

The rotational capability of build platform 20 allows for further customization of the layers used to create object 26. The ability to rotate build platform 20 allows for minimizing the amount of material cut away from one of first metal foil material 16A, second metal foil material 16B, or third metal foil material 16C.

Figure 2:
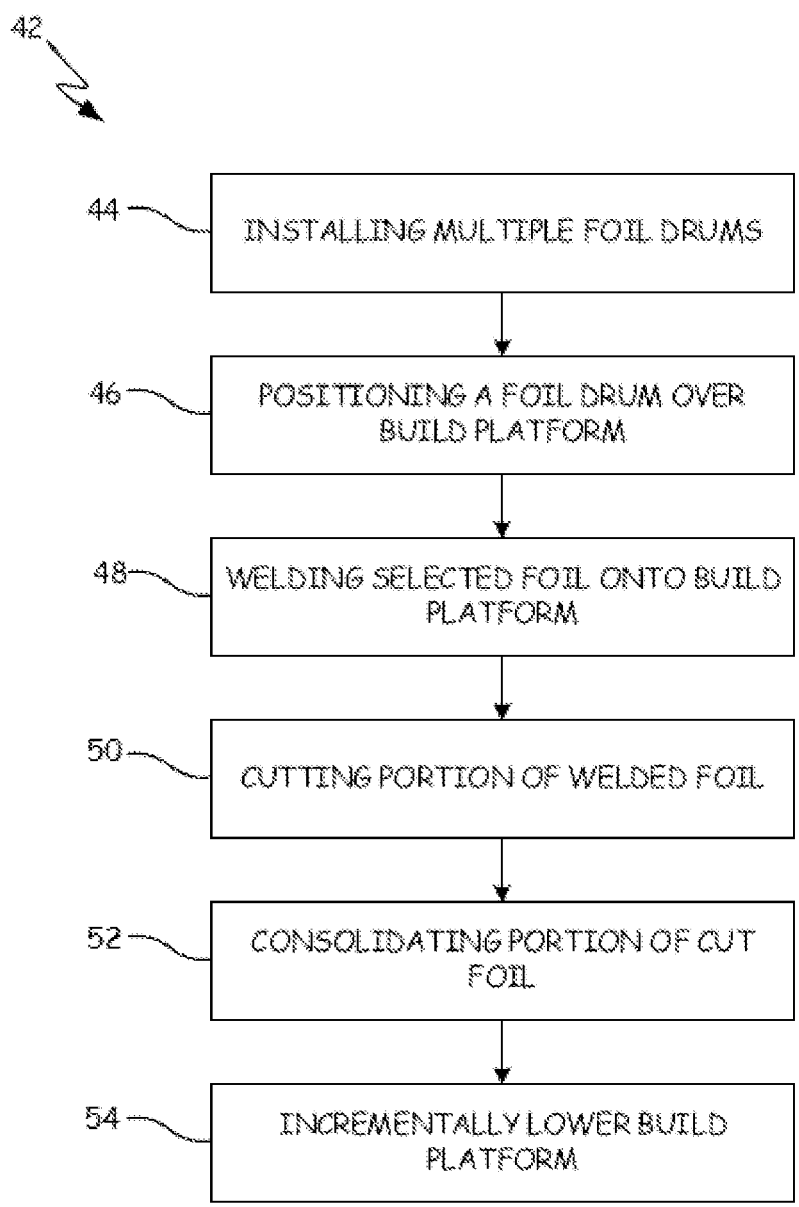
FIG. 2 is a schematic block diagram of a method of manufacturing using multiple foil drums according to the present disclosure.

FIG. 2 is a schematic block diagram of method 42 incorporating the present invention. Step 44 involves installing multiple foil drums; including first metal foil drum 14A, second metal foil drum 14B, and third metal foil drum 14C within processing chamber 11 of ultrasonic consolidation assembly 10. First metal foil material 16A includes a material different than second metal foil material 16B and third metal foil material 16C. Second metal foil material includes a material different than first metal foil material 16A and third metal foil material 16C. Third metal foil material 16C includes a material different than first metal foil material 16A and second metal foil material 16B. However, in other embodiments, first metal foil material 16A, second metal foil material 16B, and third metal foil material 16C can have any combination of materials. Step 46 includes positioning one of first metal foil drum 14A, second metal foil drum 14B, and third metal foil drum 14C over build platform 20. Step 48 includes welding one of first metal foil material 16A, second metal foil material 16B, or third metal foil material 16C onto build platform 20 or onto one of previously processed layers 34 of object 26 to create a welded metal foil material. The purpose of the welding in step 48 is to prevent the one of first metal foil material 16A, second metal foil material 16B, or third metal foil material 16C from moving around on build platform 20 or on one of previously processed layers 34. An example of a type of welding that can be used for the present embodiment includes tack welding. Step 50 includes cutting a portion of first metal foil material 16A, second metal foil material 16B, or third metal foil material 16C as per CAD file 32. Step 52 includes consolidating portion of first metal foil material 16A, second metal foil material 16B, or third metal foil material 16C with sonotrode 40 onto build platform 20 or onto one of previously processed layers 34 of object 26. Step 54 includes incrementally lowering build platform 20. Method 42 is then repeated. As method 42 is repeated, any one of first metal foil material 16A, second metal foil material 16B, or third metal foil material 16C is selected to be placed over build platform 20 thus enabling object 26 to be constructed with layers of multiple materials.

An example of how ultrasonic consolidation system 10 consolidates the multiple layers of object 26 is through ultrasonic compaction. Ultrasonic compaction is an additive manufacturing technique that involves compacting one of cut first metal foil material 16A, second metal foil material 16B, or third metal foil material 16C to already processed layers 34 of object 26 by placing sonotrode 40 (see FIG. 1) on top of one of cut first metal foil material 16A, second metal foil material 16B, or third metal foil material 16C and then vibrating sonotrode 40 at an ultra-sonic frequency in order to create a solid-state welded object. Ultrasonic compaction allows for creation of object 26 out of layers of material of varying types and of varying thicknesses.

Figure 3:
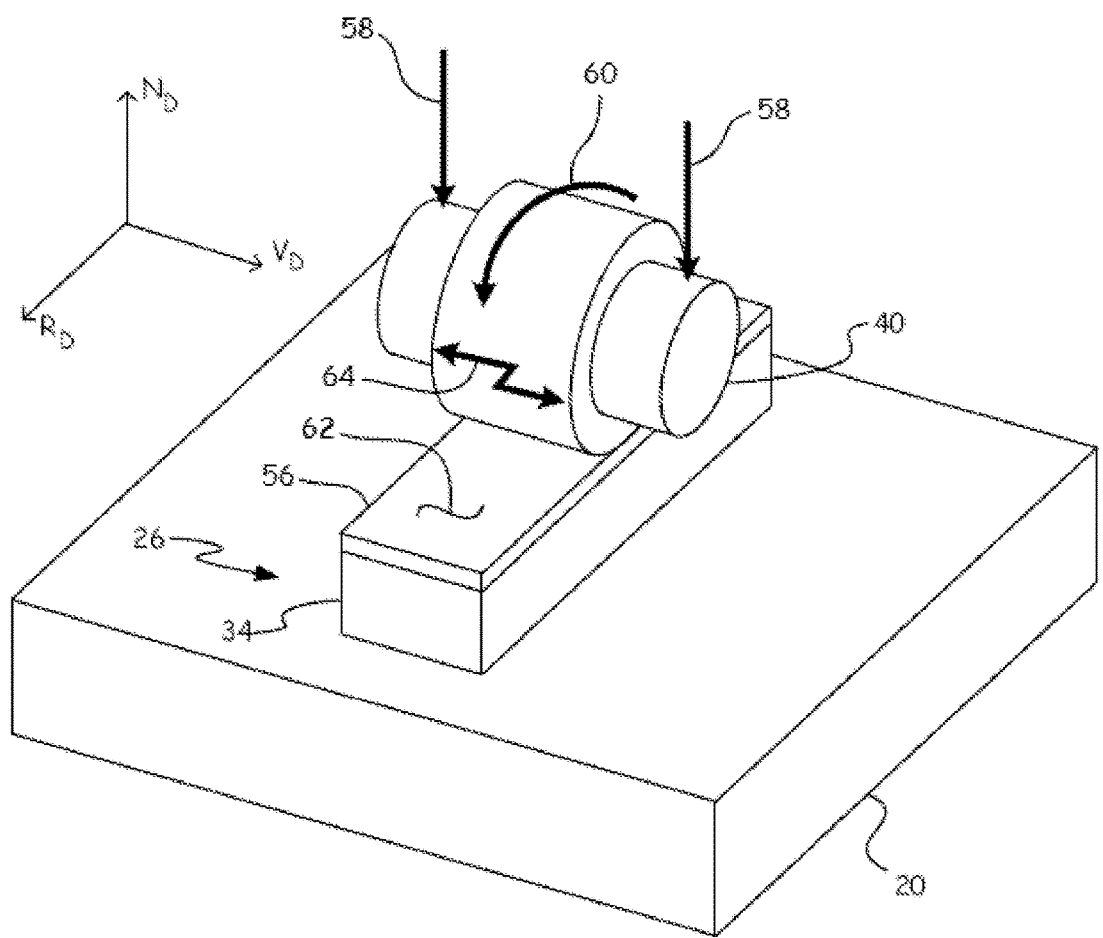
FIG. 3 is a perspective view of a sonotrode used with the ultrasonic consolidation system of FIG. 1.

FIG. 3 is a perspective view of ultrasonic consolidation system 10 in accordance with the present disclosure. FIG. 3 further exemplifies step 52 of method 10 which includes consolidating one of cut first metal foil material 16A, second metal foil material 16B, or third metal foil material 16C to already processed layers 34 of object 26. Cut metal foil material 56 represents the cut one of cut first metal foil material 16A, second metal foil material 16B, or third metal foil material 16C to be consolidated. Sonotrode 40 is lowered onto cut metal foil material 56 and ultrasonically consolidates cut metal foil material 56 onto either build platform 20 or onto one of previously processed layers 34 of object 26. The ultrasonic consolidation of cut metal foil material 56 occurs by applying normal force 58 to sonotrode 40 as sonotrode 40 is rolled across cut metal foil material 54 by rotation 60 in rolling direction $R_D$. Normal force 58 is applied downwardly to sonotrode 40 towards build platform 20 along normal direction $N_D$. Normal direction $N_D$ is orthogonal to an upper surface 62 of cut metal foil material 56 and to build platform 20. Additionally, sonotrode 40 undergoes vibration 64 in vibration direction $V_D$ to perform the ultrasonic consolidation.

The present disclosure allows for an additive manufacturing object to be built of multiple materials without disrupting the additive manufacturing process of ultrasonic consolidation. The multiple foil drums of the present disclosure enable the construction of an object with multiple materials formed together by ultrasonic consolidation, therefore providing improvement over the prior art which limits construction with ultrasonic consolidation to a single material. The present disclosure would also not be limited to having each of the multiple foil drums containing materials different from each of the other foil drums. The present disclosure also enable similar materials of varying thickness to be mounted onto the multiple foil drums to be incorporated into the ultrasonic consolidation additive manufacturing process.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of forming an object, the method comprising:
   (a) installing multiple foil drums within a processing chamber of an ultrasonic consolidation system, each of the multiple foil drums being made of a different material;
   (b) positioning the multiple foil drums so as to place a selected foil on top of a build platform;
   (c) welding the selected foil onto the build platform or a previously processed layer;

(d) cutting a portion of the welded foil;
(e) retracting the multiple foil drums away from the build platform;
(f) consolidating the portion of the welded foil to the object;
(g) incrementally lowering the build platform; and
(h) repeating steps (b)-(g) until the object is complete.

2. The method of claim 1, the method further comprising moving the build platform in a plane orthogonal to the build platform.

3. The method of claim 2, the method further comprising rotating the build platform in a plane parallel to the build platform.

4. The method of claim 1, wherein the multiple foil drums comprise metallic materials.

5. The method of claim 4, wherein the selective cutting of the selected foil is performed with a laser beam emitted from a laser source.

6. The method of claim 5, wherein the laser beam cuts the selected foil in accordance with a computer aided design file containing data that defines the object.

7. The method of claim 4, wherein the consolidation is performed by ultrasonic compaction.

8. The method of claim 7, wherein the consolidation further comprises using a sonotrode to perform the ultrasonic compaction.

9. The method of claim 4, wherein the selected foil is welded onto specific locations of the build platform or the previously processed layer.

10. An additive manufacturing method, the method comprising:
(a) positioning multiple foil drums of an ultrasonic consolidation system so as to place a first selected foil on top of a build platform;
(b) welding the first selected foil onto the build platform or a previously processed layer;
(c) selectively cutting a portion of the welded foil with a laser beam emitted from a laser source in accordance with a computer aided design file containing data that defines an object;
(d) retracting the multiple foil drums away from the build platform;
(e) ultrasonically consolidating the portion of the welded foil to the object;
(f) incrementally lowering the build platform;
(g) repositioning the multiple foil drums so as to place a second selected foil over the build platform; and
(h) repeating steps (b)-(e).

11. The method of claim 10, wherein the first and second selected foils comprise metallic materials.

12. The method of claim 11, wherein the build platform is capable of vertical movement in a direction orthogonal to a plane of the build platform.

13. The method of claim 12, wherein the build platform is capable of rotational movement.

14. The method of claim 11, wherein the consolidation is performed by ultrasonic compaction.

15. The method of claim 14, wherein the consolidation further comprises using a sonotrode to perform the ultrasonic compaction.

16. The method of claim 11, wherein the selected foil is tack welded onto specific locations of the build platform or the previously processed layer.

17. An additive manufacturing apparatus comprising:
a processing chamber;
an ultrasonic consolidation system located within the processing chamber;
a foil drum assembly installed in the ultrasonic consolidation system;
multiple foil drums of different materials located on the foil drum assembly;
a build platform located underneath one of the multiple foil drums;
a laser source located above the build platform; and
a sonotrode located above the build platform.

18. The additive manufacturing apparatus of claim 17, wherein the multiple foil drums are comprised of metallic materials.

19. The additive manufacturing apparatus of claim 18, wherein the build platform is capable of rotational movement.

20. The additive manufacturing apparatus of claim 17, the additive manufacturing apparatus further comprising a translating mechanism for translating the multiple foil drums over the build platform.

* * * * *